United States Patent [19]

Strong

[11] Patent Number: 4,746,084
[45] Date of Patent: May 24, 1988

[54] TANDEM PARACHUTE HARNESS

[76] Inventor: Edward T. Strong, 5062 Downing St., Orlando, Fla. 32809

[21] Appl. No.: 877,271

[22] Filed: Jun. 23, 1986

[51] Int. Cl.⁴ ............................................. B64D 17/30
[52] U.S. Cl. ................................ 244/151 R; 244/142; 224/159
[58] Field of Search .................... 244/142, 152, 151 R, 244/151 A, 151 B, 147, 149; 224/159, 160

[56] References Cited

U.S. PATENT DOCUMENTS

| | | | |
|---|---|---|---|
| 620,694 | 3/1899 | Chadwick | 224/160 |
| 2,556,923 | 6/1951 | Irvin | 244/151 R |
| 2,605,065 | 7/1952 | Wilkins | 244/151 R |
| 3,018,074 | 1/1962 | Quilter | 244/147 |
| 3,088,700 | 5/1963 | Carrey | 244/151 A |
| 4,337,913 | 7/1982 | Booth | 244/151 B |
| 4,560,097 | 12/1985 | Reynolds | 224/160 |

Primary Examiner—Galen Barefoot
Attorney, Agent, or Firm—Fulwider, Patton, Rieber, Lee & Utecht

[57] ABSTRACT

A student's parachute harness attaches to an instructor's parachute harness allowing both to descend in tandem. Detaching snaps at the shoulders and waist of the student's harness detachably engage fittings on generally corresponding portions of the instructor's harness to couple the tandem in proper relative body positions. The fittings at the instructor's shoulders are load distribution fittings which have a flat tangential portion connected to the canopy and reserve risers and a forwardly jutting portion connected to a snap hook on the student's harness. A drogue provides stabilization during a prone free fall by having its riser connected to the instructor's harness where the shoulder straps cross each other in the center of the instructor's back. Pulling a rip cord at the end of the drogue free fall detaches the drogue bridle from the drogue riser to release the drogue which deploys the canopy from a container attached to the instructor's harness. The student's rip cord is operated by a D-ring stowed in the student's harness, while an instructor's rip cord, operatively interconnected with the student's rip cord, is operated by a D-ring stowed in the instructor's harness.

25 Claims, 4 Drawing Sheets

TANDEM PARACHUTE HARNESS

BACKGROUND OF THE INVENTION

This invention relates generally to skydiving and more particularly has reference to a parachute harness which allows two persons to descend in tandem with a single parachute.

One of the more frightening aspects of skydiving training is the realization that any mistakes made by a student during descent could be fatal. An instructor descending alongside the student could provide psychological support and could reinforce lessons learned on the ground, but he is in a poor position to render physical assistance. The student is left essentially on his own to execute the proper procedures.

The safety of skydiving training could be enhanced dramatically if the instructor were placed in a position to act as a back-up, executing those procedures which the student failed to perform or performed erroneously. One way to achieve that is to have the instructor and student descend in tandem using a single parachute. Unfortunately, a tandem descent can be extremely dangerous if the two participants do not maintain proper relative body positions. The danger is enhanced when conventional skydiving equipment is used because it does not take account of the different aerodynamic and load distribution requirements of a tandem descent. In addition, the use of conventional equipment would significantly diminish the benefits of a tandem descent because both participants would not have equal access to the various control devices which deploy the canopy.

A need exists for equipment which can be used by a student and instructor to descend in tandem without the attendant dangers and drawbacks.

SUMMARY OF THE INVENTION

The present invention overcomes the problems which exist in the prior art by providing a parachute harness with dual canopy deployment controls that allows a student and instructor to descend in tandem while maintaining proper aerodynamics, load distribution and relative body positions.

Separate body harnesses are provided for the instructor and student. The instructor stands facing the student's back and couples the student's harness to his harness by one set of snap hooks attached to coupling loops extending from the student's shoulders and another set of snap hooks on the ends of coupling straps extending around the student's waist. The snap hooks detachably engage rings or eye fittings attached to the shoulders and waist of the instructor's harness. The interconnection between the harnesses insures that the bodies of the instructor and student will remain in proper relative positions during descent.

The fittings on the shoulders of the instructor's harness are specially designed unitary fittings that have a flat portion which extends generally tangential to the harness and a jutting portion which extends outwardly forward from the harness. The student's snap hooks engage an eye formed in the jutting portion of the fittings, while releasable rings on the ends of the canopy risers engage an eye formed in the flat portion of the fittings. The fittings are attached to the instructor's harness between the eyes. That arrangement distributes the load to both harnesses independently when the canopy is deployed. Further structural loading is provided by an attachment strap which is connected to the coupling straps extending around the student's waist and integrated with a lower back strap in the instructor's harness.

A drogue riser is connected to the instructor's harness where the shoulder straps cross each other in the center of the instructor's back. That location maintains the aerodynamic balance needed to keep the skydiver's bodies in the prone position when the drogue attached to the riser is deployed during free fall. The connection is made by a rectangular link which has one side positioned beneath the crossed portions of the straps and an opposing side connected to the drogue riser.

A drogue bridle detaches from the drogue riser when a rip cord is pulled at the end of free fall. A deployment line connected to the detached drogue bridle opens a container on the instructor's back and pulls the canopy therefrom. The canopy deploys as the released drogue moves away from the free falling tandem.

The student and instructor are each provided with their own rip cord. A pin on the end of the instructor's rip cord is operatively connected to a release mechanism which, when activated, detaches the drogue bridle from the drogue riser. The end of the student's rip cord is operatively connected to the pin by an eyelet slidably disposed around the pin. D-rings on the remote ends of the rip cords act as handles which are grasped to pull the cords. The release mechanism is activated by pulling either the instructor's rip cord or the student's rip cord. The operative connection between the ends of the rip cords disengages when the instructor's rip cord is pulled, thereby freeing the instructor's rip cord from the inertia of the student's rip cord and preventing it from snagging if the student has somehow fouled his own rip cord.

One object of the invention is, therefore, to provide an improved parachute harness.

Another object of the invention is to provide a parachute harness which is aerodynamically correct for free fall in the prone position.

Yet another object of the invention is to provide a tandem parachute harness capable of maintaining the skydiver's bodies in the correct relative position for a tandem descent.

Another object of the invention is to provide a tandem parachute harness having dual canopy deployment controls. It is a further object to provide dual canopy deployment controls which are operatively interconnected so that the canopy can be independently deployed by either skydiver.

Still another object of the invention is to provide tandem parachute harnesses which distribute the load between the two skydivers independently when either the main or reserve canopy is deployed.

Yet another object of the invention is to provide tandem parachute apparatus comprising a first body harness having a first pair of shoulder straps and a first lower back strap, first couplings connected to each of the first pair of shoulder straps, second couplings connected to the first lower back strap, a second body harness adjacent a frontal portion of the first body harness have a second pair of shoulder straps and a second lower back strap, third couplings connected to upper portions of each of the second pair of shoulder straps and being detachably engageable with the first couplings, and fourth couplings connected to lower portions of the second pair of shoulder straps and being detachably engageable with the second couplings.

Still another object of the invention is to provide tandem parachute apparatus comprising a first body harness, a second body harness connected to the first body harness, a drogue bridle detachably connected to the first body harness, a release mechanism for detaching the drogue bridle from the first body harness during descent, a first rip cord having a first end operatively connected to the release mechanism for selectively activating the release mechanism and a second end provided with means associated with the first body harness for pulling the first rip cord, and a second rip cord having a first end operatively connected to the first end of the first rip cord for selectively actuating the first end of the first rip cord and a second end provided with means associated with the second body harness for pulling the second rip cord.

Yet another object of the invention is to provide tandem parachute apparatus comprising a first body harness, fittings attached to the first harness having a first portion generally tangential to the harness and a second portion extending outwardly thereof, canopy risers connected the first portion of the fittings and a second body harness connected to the second portion of the fittings, the first body harness being attached to the first portion of the fittings between the canopy risers and the second body harness.

Still another object of the invention is to provide tandem parachute apparatus comprising a first body harness, a second body harness connected to the first body harness, a drogue, and a drogue riser extending from the drogue and being connected to a central rear portion of the first body harness.

These and other and further objects and features of the invention are apparent in the disclosure which includes the above and below specification and claims and drawings.

DETAILED DESCRIPTION OF THE DRAWINGS

Figures 1, 2:
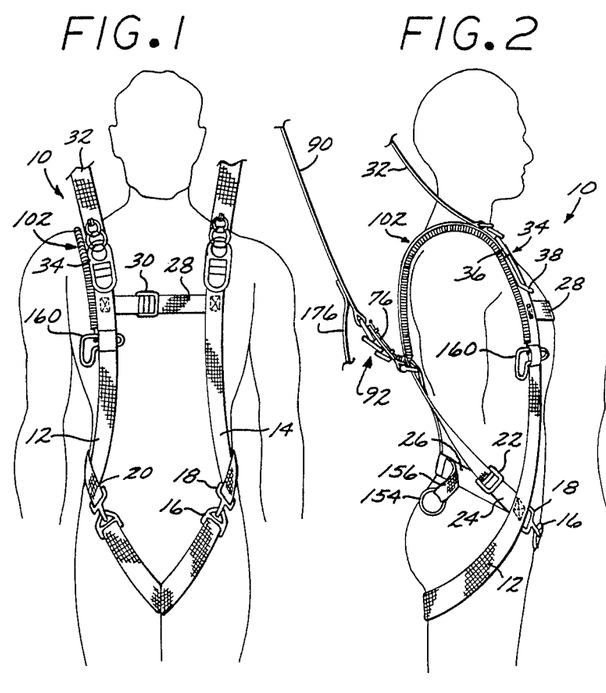
FIG. 1 is a front elevational view of the instructor's harness embodying features of the present invention.
FIG. 2 is a side elevational view of the harness shown in FIG. 1.
Figure 3:
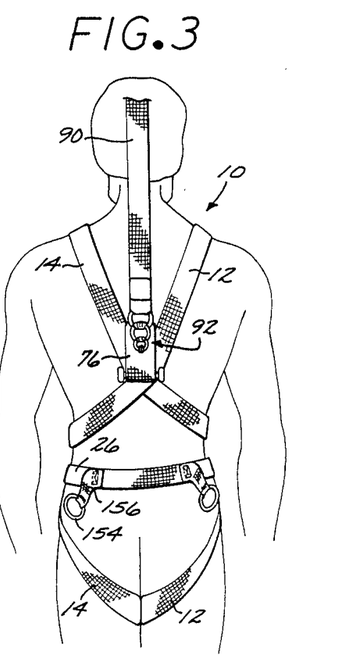
FIG. 3 is a rear elevational view of the harness shown in FIG. 1.

Referring to FIGS. 1-3, an instructor's harness embodying features of the present invention is indicated generally by the numeral 10.

The harness 10 has a pair of elongated shoulder straps 12 and 14 which extend down the instructor's chest and cross his hips to a position beneath his buttocks. There, they pass between his legs and extend up to the sides of his abdomen where they are threaded through length-adjustment buckles 16 detachably connected to snap hooks 18 on the ends of short straps 20 sewn to lower frontal portions of the shoulder straps 12 and 14. The shoulder straps 12 and 14 also extend down the instructor's back, where they cross in the center and continue down to just about his waist, terminating in length-adjustment buckles 22. Short straps 24 sewn to the shoulder straps 12 and 14 at the locations of the first mentioned short straps 20 are threaded through the same length-adjustment buckles 22. The lower back strap 26 extends across the instructor's lower back and is sewn to the shoulder straps 12 and 14 in the same general location as the short straps 20 and 24. A chest strap 28 with a length-adjustment buckle 30 extends across the instructor's chest and is sewn to the upper chest portions of the shoulder straps 12 and 14.

Figure 16:
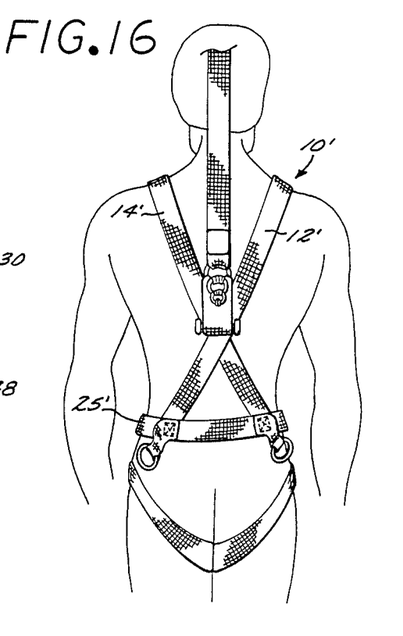
FIG. 16 is a rear elevational view of an alterantive instructor's harness.

FIG. 16 shows an alternative instructor's harness 10' which is substantially similar to the harness 10 shown in FIG. 3 with the exception that the lower rear ends of the shoulder straps 12' and 14' are connected to opposite sides of the lower back strap 26'.

Although the harness 10 surrounds the instructor's body to provide a secure foundation for suspending him from a canopy, it is easy to remove. He need only detach the snap hooks 18 from the buckles 16, unthread the chest buckle 30, allow the ends of the straps 12 and 14 to fall between his legs and open the chest strap 28. This easy removal capability is essential to free him from the harness 10 quickly when, for example, he lands in a body of water.

Figure 11:
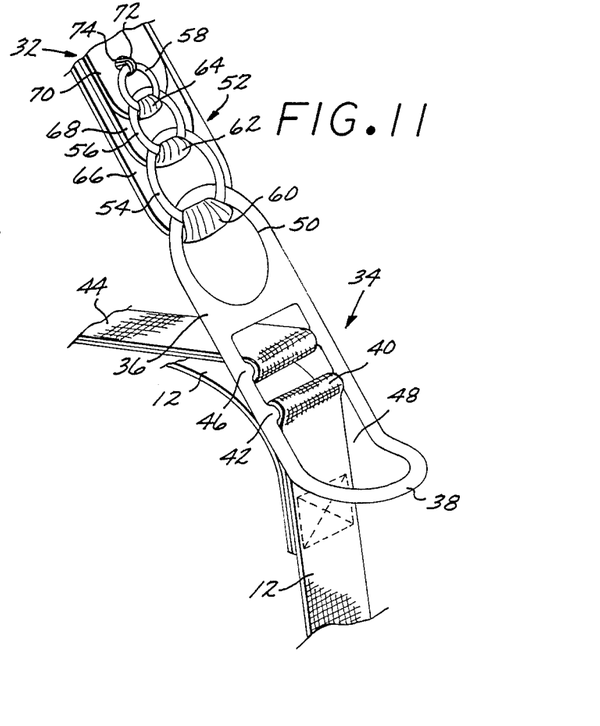
FIG. 11 is a fragmentary, detailed view of the specially designed fitting on one of the shoulders of the instructor's harness.

Risers 32 extending from a canopy (not shown) are detachably connected to specially designed fittings 34 on upper frontal portions of the shoulder straps 12 and 14. As best shown in FIGS. 2 and 11, the fittings 34 are unitary castings having a flat portion 36 generally tangential to the shoulder straps 12 and 14 and a jutting portion 38 on the lower end of the flat portion 36 which extends outwardly forward from the shoulder straps 12 and 14. A loop 40 formed in the shoulder straps 12 and 14 passes around a lower crossbar 42 traversing the flat portion 36 to attach the fittings 34 to the straps 12 and 14. The risers 44 connected to a reserve parachute (not shown) are attached to the fittings 34 by looping around an upper crossbar 46 traversing the flat portion 36. The crossbars 42 and 46 are generally in the center of the fittings 34 and traverse an elongated opening 48 spanning the jutting portion 38 and the lower part of the flat portion 36.

The canopy risers 32 are detachably connected to an eye 50 in the upper end of the flat portion 36 of the fittings 34 by conventional release mechanisms 52. The release mechanism 52 includes a sequence of overlapping rings 54, 56 and 58 of decreasing diameter attached to flaps 60, 62 and 64 formed on the ends of superimposed layers 66, 68 and 70 of the riser 32. The first ring 58 in the sequence is held in place by a cord 72 which loops around the ring 58 and passes through an opening 74 in the riser 32. Releasing the cord (in a manner to be more fully described later with respect to FIGS. 8 and 9) causes the first ring 58 to flip down and pass through the second ring 56 which in turn then flips down and passes through the third ring 54. The third ring 54 then flips down and passes through the eye 50 to release the riser 32 from the fitting 34. The release mechanism 52 thus allows the instructor to detach both he and the student quickly from the canopy in the event of a main parachute malfunction or a landing in high wind or water.

Figure 4:
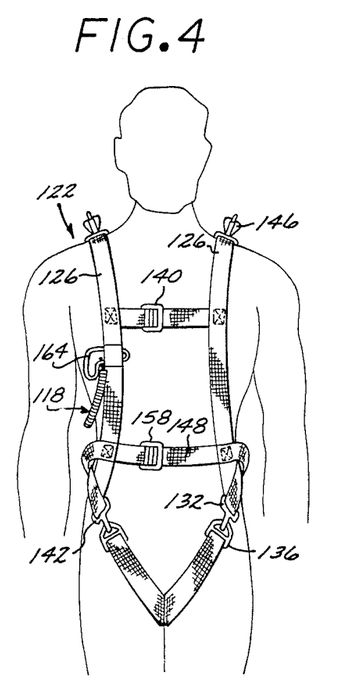
FIG. 4 is a front elevational view of the student's harness embodying features of the present invention.
Figure 5:
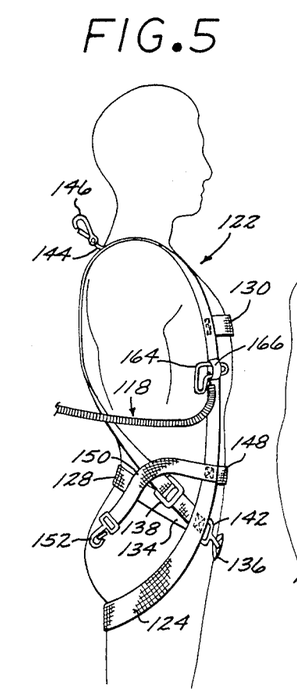
FIG. 5 is a side elevational view of the harness shown in FIG. 4.
Figure 6:
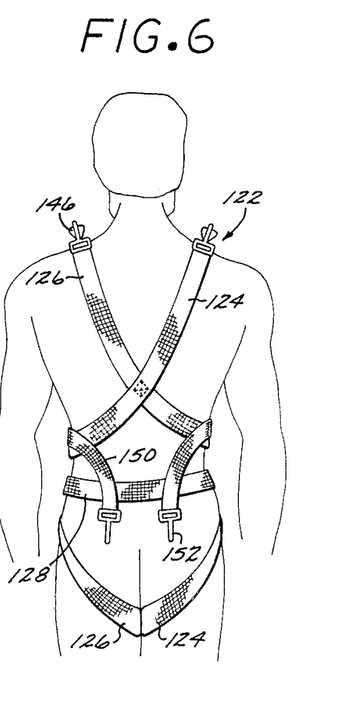
FIG. 6 is a rear elevational view of the harness shown in FIG. 4.

Referring now to FIGS. 4, 5 and 6, it can be seen that the student's harness 122 bears a number of similarities to the instructor's harness 10. Specifically, the elongated shoulder straps 124 and 126, the lower back strap 128, the chest strap 130, the short straps 132 and 134 and the associated length adjustment buckles 136, 138 and 140 and snap hooks 142 are essentially identical.

Figure 7:
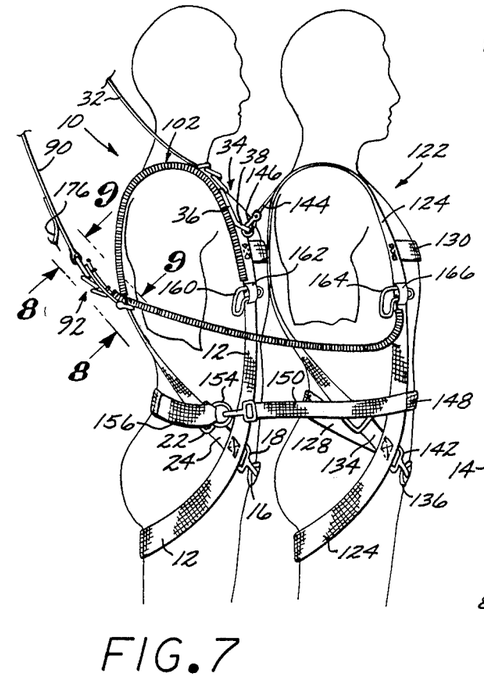
FIG. 7 is a side elevational view showing the harnesses of FIGS. 1 and 4 coupled together.

As shown in FIG. 7, the student's harness 122 is detachably connected to the instructor's harness 10 by a plurality of coupling straps and loops and associated attachment fittings. The student's back rests against the instructor's chest and the torsos of both are held in synchronized alignment. Their bodies will remain in the correct relative position throughout the tandem descent.

A coupling loop 144 integrated into the top, slightly rearward portion of each of the student's shoulders straps 124 and 126 holds a snap hook 146 which detachably engages the elongated opening 48 in the jutting portion 38 of the fittings 34 on the corresponding shoulder straps 12 and 14 of the instructor's harness 10. The fittings 34 distribute the load between the two harness 10 and 122 independently when the canopy is deployed. An abdominal strap 148 has coupling strap end portions 150 which extend rearwardly across the student's kidney regions and terminate in snap hooks 152 with integral length-adjustment buckles. The hooks 152 detachably engage rings 154 on the ends of an attachment strap 156 coextensive with a central portion of the instructor's lower back strap 26. The abdominal strap 148 is sewn to lower frontal portions of the student's shoulder straps 124 and 126 and is provided with a length adjustment fitting 158 between the shoulder straps 124 and 126. (See FIG. 4) A medial portion of the attachment strap 156 spaced inwardly from the rings 154 is sewn to the instructor's lower back strap 26 so as to be integral therewith. (See FIG. 3)

A drogue (not shown) is deployed during free fall to aerodynamically stabilize the tandem in the prone position. Either the instructor or the student deploys the drogue by reaching behind his back and manually pulling it out of the pouch. The drogue is connected to the instructor's harness 10 by a drogue riser 76, best shown in FIGS. 2, 3 and 8, which is connected to a central rear portion of the instructor's harness 10 where the shoulder straps 12 and 14 cross each other. That position maintains the aerodynamic balance needed to hold the free falling skydivers in the prone position.

Figures 8, 9:
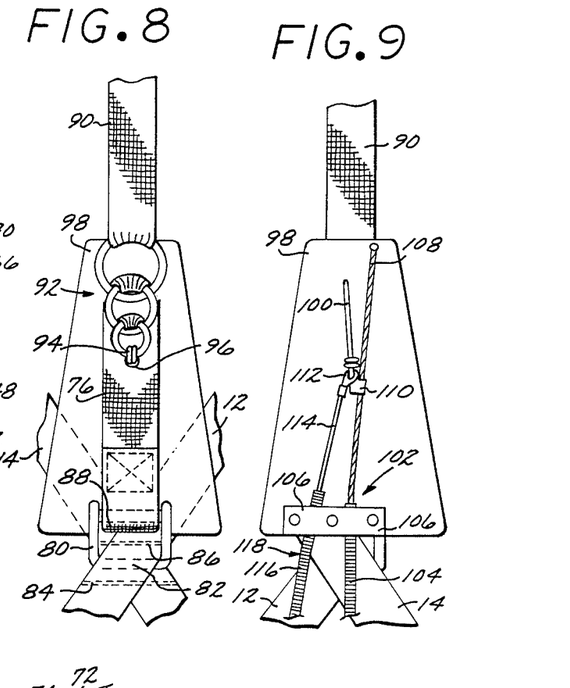
FIG. 8 is a fragmentary, detailed view of the detachable connection between the drogue riser and the drogue bridle.
FIG. 9 is a fragmentary, detailed view of the reverse side of the structure shown in FIG. 8, illustrating the operative interconnection between the dual rip cords used to deploy the canopy.

As shown in FIG. 8, the drogue riser 76 is permanently attached to the harness 10 by a rectangular link 80. One side 82 of the link is positioned under the crossed portions of the straps 12 and 14. The straps 12 and 14 are stitched together at locations 84 and 86 below and above the side 82 to keep the link 80 in place. The opposing side 88 of the link is engaged by the looped lower end of the riser 76.

As shown in FIG. 8 and 9, the upper end of the riser 76 is detachably connected to a drogue bridle 90 by a release mechanism 92 substantially identical to the ones 52 associated with the canopy risers 32. The cord 94 which holds the first ring in the release mechanism 92 passes through an opening 96 in the drogue riser 76 and a mounting plate 98 attached to the reverse side of the riser 76. The cord 94 forms a closed loop which snuggly engages a rigid pin 100. A first rip cord 102 has a cable core 108 crimped to a collar 110 on the end of the pin 100 and slidably disposed in a flexible metal conduit 104 mounted on the plate 98 by a strap 106. An eyelet 112 crimped to the end of the cable core 114 slidably disposed in the flexible metal conduit 116 of a second rip cord 118 mounted on the plate 98 by the strap 106 slides over the pin 100. An extension of the cable 108 beyond the collar 100 limits the downward travel of the eyelet 112 relative to the pin 100.

A strong pull on the cable of the first rip cord 102 slides the pin 100 out of the loop formed by the cord 94. The released cord 94 passes through the opening 96 in the mounting plate 98 and riser 76, freeing the first ring in the release mechanism 92 and initiating the sequential ring flipping disengagment procedure described above which detaches the drogue bridle 90 from the drogue riser 76.

The drogue bridle 90 can be detached from the drogue riser 76 by pulling either rip cord 102 and 118 because the eyelet 112 establishes an operative interconnection between the rip cords 102 and 118. Pulling the cable 114 of the second rip cord 118 slides the pin 100 out of the cord 94 and initiates the release sequence described above in the same manner as if the first rip cord 102 were pulled directly. However, it should be noted that the pin 100 slides freely out of the eyelet 112 when the release mechanism 92 is activated by pulling the first rip cord 102 so that the pin 100 can move without having to overcome any inertial resistance caused by the stationary core 114 of the second rip cord 118.

As shown in FIGS. 2 and 7, a canopy deployment line 176 is attached to the drogue bridle 90. When the release mechanism 92 is activated to detach the bridle 90 from the drogue riser 76, the drogue (not shown) connected to the bridle 90 is released from the free falling tandem. The released drogue pulls the canopy (not shown) from a main parachute container via the deployment line 176, in a manner well known in the art.

Referring again to FIG. 7, the first rip cord 102 is shown extending over the instructor's shoulder and terminating in a D-ring 160 stowed in a pocket 162 on the instructor's shoulder strap 12. The second rip cord 118 passes under the arms of the instructor and student and terminates in a D-ring 164 stowed in a pocket 166 on the student's shoulder strap 124.

Figure 10:
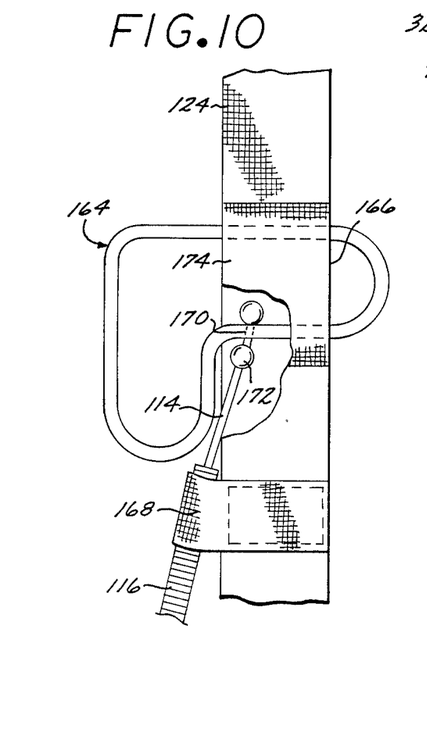
FIG. 10 is a fragmentary, detailed view of the stowed D-rings on the ends of the rip cords.

Details of the student's D-ring and pocket 166 are shown in FIG. 10. The D-ring 164 is a ring-like element generally shaped in the form the letter "L". One leg of the D-ring 164 is received in the pocket 166 for holding the ring 164 in a stowed position. The other leg of the D-ring acts as a handle to be gripped by the student for pulling the rip cord cable 114. The rip cord conduit 116 is held in a tab 168 sewed to the shoulder strap 124 immediately below the pocket 166. The end of the rip cord cable 114 passes through a bore 170 in the stowed leg of the D-ring and is held therein by a pair of enlarged balls 172 crimped to the cable 114 on opposite sides of the bore 170. The pocket 166 is formed by a short piece 174 of elastic strap material sewed onto the shoulder strap 124.

While FIG. 10 is specific to the D-ring 164 and related structure associated with the student's harness 122, it is understood that the D-ring 160 and related structure associated with the instructor's harness 10 are substantially similar.

The dual control mechanism for deploying the canopy can now be readily understood. During free fall, it is hoped that the student will attempt to deploy the canopy at the proper time by grasping his D-ring 164, removing it from its pocket 166 and thrusting it outward with sufficient force to pull the cable 114 and activate the bridle release mechanism 92 in the manner described above. If the student fails to react or makes some mistake which results in failure to deploy the canopy at the proper time, the instructor can deploy the canopy himself by grasping his own D-ring 160, removing it from its pocket 162 and thrusting it outward with sufficient force to pull the cable in his rip cord 102 and activate the bridle release mechanism 92.

Figure 12:
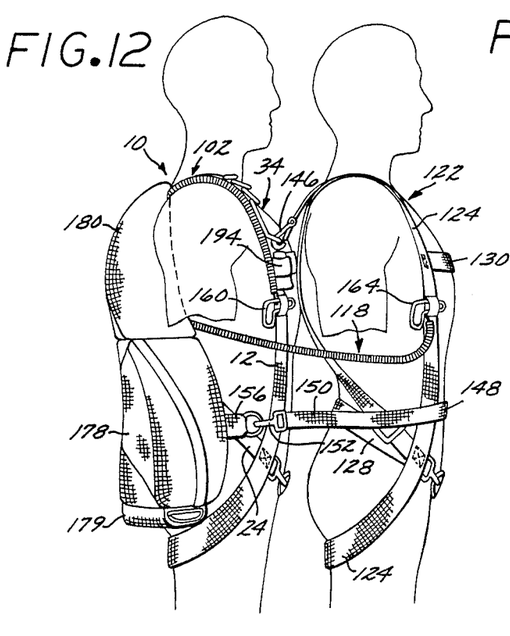
FIG. 12 is side elevational view similar to FIG. 7 in which the parachute containers have been mounted on the instructor's back.

Referring now to FIGS. 12, a main parachute container 178 and a reserve parachute container 180 are shown mounted on the instructor's back. The main canopy is packed in the main parachute container 178, a reserve parachute is packed in the reserve container 180, and a drogue is packed in a pouch 179 at the bottom of the main parachute container 178, all in a manner well-known in the art.

Figure 13:
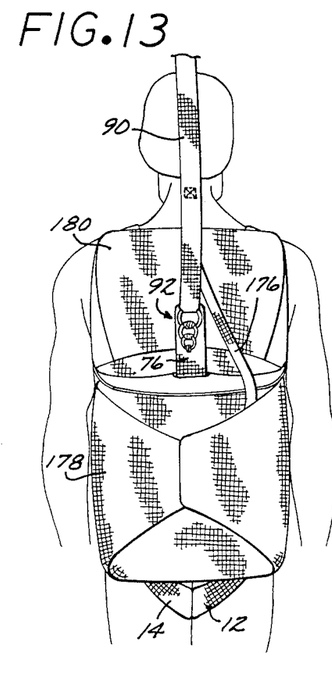
FIG. 13 is a rear elevational view of the arrangement shown in FIG. 12 with the drogue deployed.
Figure 14:
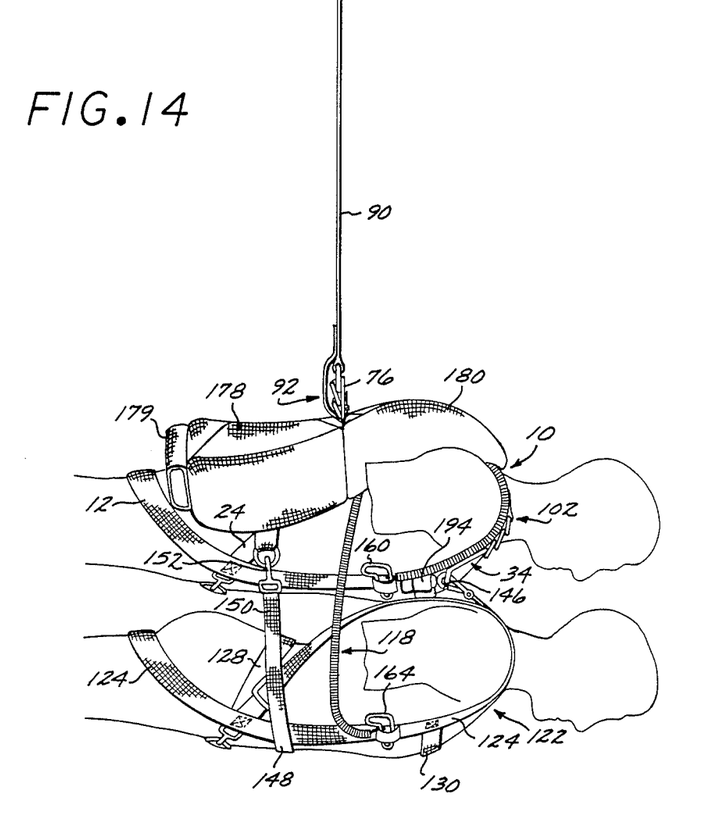
FIG. 14 is a side elevational view illustrating the arrangement of FIG. 13 during drogue free fall.
Figure 15:
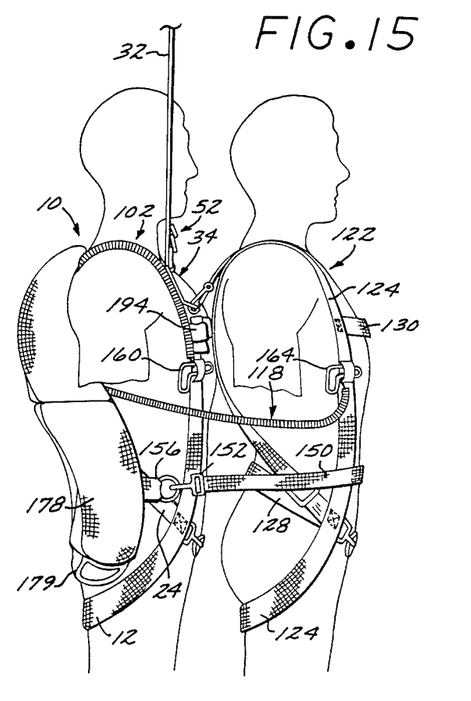
FIG. 15 is a side elevational view illustrating the arrangement of FIG. 12 after deployment of the canopy.

The drogue bridle 90 and associated structure appear as shown in FIG. 13 after the drogue is deployed and appear as shown in FIG. 14 during drogue free fall. The canopy risers 32 assume the position shown in FIG. 15 after the canopy is deployed.

While the harnesses 10 and 122 have thus far been described as an instructor's harness and a student's harness respectively, it is understood that the invention is not limited to teaching situations. It can be used by any two persons wishing to make a tandem descent. In non-teaching situations, it may be proper to call the rear harness 10 the "pilot's" harness and the front harness 122 the "passenger's" harness.

While the invention has been described with reference to specific embodiments, the exact nature and scope of the invention is defined in the following claims.

I claim:

1. Tandem parachute apparatus comprising
a first body harness having a pair of shoulder straps;
rigid fittings attached to respective ones of the shoulder straps, each of said fittings having a medial portion connected directly to the shoulder strap and first and second end portions on opposite sides of said medial portion;
canopy risers connected to the first end portions of the fittings; and
a second body harness connected to the second end portions of the fittings.

2. The apparatus of claim 1 further comprising attachment means in the first and end portions of the fittings for attaching the fittings to the canopy risers and second body harnes.

3. The apparatus of claim 2 wherein the attachment means comprise eyes.

4. The apparatus of claim 1 wherein the fittings comprise unitary castings.

5. The apparatus of claim 1 wherein the fittings are attached to an upper portion of the first body harness for distributing load from the canopy risers to both the first and second body harness independently.

6. The apparatus of claim 1 wherein the first body harness is permanently attached to the fittings by loops which engage a transverse crossbar in the medial portion of the fittings.

7. The apparatus of claim 1 further comprising reserve parachute risers connected to the fittings.

8. The apparatus of claim 7 wherein the reserve parachute risers are connected to the medial portion of the fittings.

9. The apparatus of claim 1 wherein
the first body harness has a first pair of shoulder straps attached to said rigid fittings, first a first lower back strap;
the second body harness has a rearward portion positioned adjacent a frontal portion of the first body harness and further has a second pair of shoulder straps and a second lower back strap;
first couplings connected to upper portions of each of said second pair of shoulder straps and being detachably engageable with said rigid fittings; and
second couplings connected to lower portions of said second pair of shoulder straps and being detachably engageable with said first lower back strap.

10. The apparatus of claim 9 wherein the first couplings comprise coupling loops connected to top rear portions of said second pair of shoulder straps, said loops supporting attachment means for detachably engaging said fittings.

11. The apparatus of claim 9 further comprising a pair of first attachment means extending across side portions of said first body harness from opposite rear portions of the first lower back strap, the second couplings comprising a pair of coupling straps extending across side portions of said second body harness from end portions of an abdominal strap which extends between adbominal portions said second pair of shoulder straps, said coupling straps terminating in second attachment means configured to detachably engage said first attachment means.

12. The apparatus of claim 11 further comprising an attachment strap integral with said first lower back strap and terminating at each end in said first attachment means.

13. The apparatus of claim 1 wherein the first end portions of the fittings are generally coplanar with the medial portion thereof and the second portions of the fittings extend outwardly forward of the medial portion thereof.

14. Tandem parachute apparatus comprising
a first body harness;
a second body harness connected to the first body harness, said second body harness having top shoulder regions and a central rear attachment portion displaced from the top shoulder regions;

a drogue riser connected directly to said central rear attachment portion of the second body harness; and a drogue connected to the drogue riser.

15. The apparatus of claim 14 wherein the second body harness has a pair of shoulder straps having crossed rear portions, the drogue riser being connected to the shoulder straps at the crossed rear portions.

16. The apparatus of claim 15 wherein a rectangular link is provided for connecting said drogue riser to said pair of shoulder straps, said link having a side positioned below said crossed rear portions of the shoulder straps and an opposing side connected to the drogue riser.

17. The apparatus of claim 14 further comprising a drogue bridle extending from said drogue and beign detachably connected to said drogue riser.

18. The apparatus of claim 17 further comprising canopy risers connected to first said first second body harness, a canopy connected to the canopy risers, and deployment means for deploying said canopy, the drogue bridle being operatively connected to the deployment means for activating said deployment means when said drogue bridle detaches from said second body harness during decent.

19. Tandem parachute apparatus comprising:
a first body harness having a first pair of shoulder straps and first lower back strap;
first couplings connected to each of said first pair of shoulder straps;
second couplings connected to said first lower back trap;
a second body harness adjacent a frontal portion of the first body harness having a second pair of shoulder straps and a second lower back strap;
third couplings connected to upper portions of each of said second pair of shoulder straps and being detachably engageable with said first couplings; and
fourth couplings connected to lower portions of said second pair of should straps and being detachably engageable with said second couplings, and
further comprising a drogue bridle detachably connected to the first body harness, a release mechanism for detaching said drogue bridle from the first body harness, a first rip cord having a first end operatively connected to the release mechanism for selectively actuating said release mechanism and a second end provided with means associated with the first body harness for pulling the first rip cord, and a second rip cord having a first end operatively connected to the first end of the first rip cord for selectively actuating said first end of the first rip cord and a second end provided with means associated with the second body harness for pulling the second rip cord.

20. The apparatus of claim 19 wherein the first rip cord comprises a slidable cable terminating at said first end thereof in a pin operatively connected to the release mechanism, the second rip cord comprising a slidable cable terminating at said first end thereof in an eye slidably disposed around said second pin.

21. Tandem parachute apparatus comprising
a first body harness;
a second body harness connected to the first body harness;
a drogue bridle detachably connected to the first body harness;
a release mechanism for detaching the drogue bridle from the first body harness during descent;
a first rip cord having a first end operatively connected to the release mechanism for selectively activating said release mechanism and a second end provided with means associated with the first body harness for pulling the first rip cord; and
a second rip cord having a first end operatively connected to the first end of the first rip cord for selectively actuating said first end of the first rip cord and a second end provided with means associated with the second body harness for pulling the second rip cord.

22. The apparatus of claim 21 wherein the drogue bridle is connected to a central rear portion of the first body harness.

23. The apparatus of claim 21 wherein the first rip cord comprises a slidable cable terminating at said first end thereof in a pin operatively connected to the release mechanism, the second rip cord comprising a slidable cable terminating at said first end thereof in an eye slidably disposed around said pin.

24. The apparatus of claim 21 further comprising a canopy connected to the first body harness and deployment means for deploying the canopy, said drogue bridle being operatively connected to the deployment means for activating said deployment means when said drogue bridle detaches from said first body harness during descent.

25. Tandem parachute apparatus comprising
a first body harness;
a second body harness connected to the first body harness;
a drogue bridle detachably connected to the first body harness;
a release mechanism for detaching the drogue bridle from the first body harness during descent;
a first rip cord having a first end operatively connected to the release mechanism for selectively activating said release mechanism and a second end provided with means associated with the first body harness for pulling the first rip cord; and
a second rip cord having a first end operatively connected to the release mechanism for selectively activating said release mechanism and a second end provided with means associated with the second body harness for pulling the second rip cord.

* * * * *

UNITED STATES PATENT AND TRADEMARK OFFICE
CERTIFICATE OF CORRECTION

PATENT NO. : 4,746,084
DATED : May 24, 1988
INVENTOR(S) : Edward T. Strong

It is certified that error appears in the above-identified patent and that said Letters Patent is hereby corrected as shown below:

Column 2, line 64, delete "have" and insert --having--;

Column 4, line 11, delete "alterantive" and insert

--alternative--;

Column 8, line 2, after "and" insert --second--;

line 49, after "portions" insert --of--;

Column 9, line 15, delete "beign" and insert --being--;

line 18, delete "first" (both occurrences);

line 24, delete "decent" and insert --descent--;

line 31, delete "trap" and insert --strap--;

line 40, delete "should" and insert --shoulder--;

Signed and Sealed this

Twenty-seventh Day of December, 1988

Attest:

DONALD J. QUIGG

*Attesting Officer*      *Commissioner of Patents and Trademarks*